US006779914B2

United States Patent
Katsuo et al.

(10) Patent No.: US 6,779,914 B2
(45) Date of Patent: Aug. 24, 2004

(54) LICENCE PLATE ADAPTED FOR INTERNAL ILLUMINATION

(76) Inventors: Arai Katsuo, Kanagawa-ken, Fujisawa-shi, Cho Go 2488-30 (JP); Enomoto Toshinori, Kanagawa-ken, Yokohama-shi,Asahiku-kirigasaku (JP); Bounnakhone J. Suyavong, 1451 Fisher Avenue, Ottawa, Ontario (CA), K2C 1X3; Kham Jimmy Chounpanh, 470 Doubletree Lane, Newmarket, Ontario (CA), L3X 39E ( * ) Notice: Subject to any disclaimer, the term of this patent is extended or adjusted under 35 U.S.C. 154(b) by 9 days.

(21) Appl. No.: 10/163,589

(22) Filed: Jun. 7, 2002

(65) Prior Publication Data

US 2003/0227780 A1 Dec. 11, 2003

(51) Int. Cl.[7] ................................................ B60Q 1/58
(52) U.S. Cl. .................. 362/497; 362/520; 362/812; 40/206
(58) Field of Search ................................. 362/497, 520, 362/521, 522, 29, 812; 40/204, 206, 209

(56) References Cited

U.S. PATENT DOCUMENTS

| | | | | |
|---|---|---|---|---|
| 3,604,921 A | * | 9/1971 | Wood et al. | 362/308 |
| 3,973,342 A | * | 8/1976 | Gubela | 40/582 |
| 5,455,129 A | * | 10/1995 | Bussard | 430/1 |
| 5,485,145 A | * | 1/1996 | Sniff | 340/815.4 |
| 2002/0127949 A1 | * | 9/2002 | Lee et al. | 446/384 |

* cited by examiner

Primary Examiner—Alan Cariaso
Assistant Examiner—Mark Tsidulko
(74) Attorney, Agent, or Firm—Kramer & Amado, P.C.; Gordon J. Zimmerman, Esq.

(57) ABSTRACT

A licence plate adapted for illumination, which has an opaque face plate having outward-facing and inward-facing faces, and cut-out areas corresponding to numerals, letter, symbols or designs; and a translucent, heat-deformable backing plate heat-pressed against the inward-facing face of the face plate to force portions of the backing plate into the cut-out areas, such that when the licence plate is illuminated from a point inward of the backing plate, the portions of the backing plate within the cut-out areas are illuminated for viewing from a point outward of the face plate.

19 Claims, 3 Drawing Sheets

LICENCE PLATE ADAPTED FOR INTERNAL ILLUMINATION

BACKGROUND TO THE INVENTION

Licence plates on motor vehicles are an important tool for identification of vehicles. Most jurisdictions require that a licence plate appear at least on the rear of the vehicle. In this way, vehicles approaching from behind can quickly identify the vehicle in front. This is most important for police activities which, with modern techniques, allow a determination as to whether the vehicle is stolen or subject to unpaid traffic violations without the need for a police officer to confront the driver.

Typically, licence plates are stamped from a single piece of sheet metal. Embossed letters or numbers form a unique identifying code and are typically painted a different colour from the background of the licence plate. In addition, other indicia such as the logo or motto of a particular jurisdiction may be embossed and painted in order to individualize licence plates for each jurisdiction.

Modern licence plates are made visible at night in two ways. First, the embossed letters, numbers and symbols may be coated with a reflective paint so that when the headlights of a vehicle approaching from the rear illuminate the licence plate, a significant amount of light is reflected from those specially painted areas. Indeed, both the background and the embossed letters, numbers and symbols may be painted with reflective paints of different colours so that each stands out. In addition, or in the alternative, external lighting in the well in which the licence plate sits may be directed onto the licence plate in order to ensure adequate illumination and visibility from a distance.

Nonetheless, dust, oil, and other grime can collect on the surface of a licence plate thus severely decreasing its reflectiveness. Accordingly, whether illuminated from lighting in the licence plate well, or by approaching headlights, the licence plate may not be as visible as desired. Also, external lighting in the licence plate well of a vehicle may be exposed to damage by collision, random debris or vandalism. When external lighting ceases to function, visibility decreases.

Also, in some situations, it is advantageous to identify a vehicle without shining headlights from another vehicle onto its licence plate. Illumination provided by light reflected from the external lighting in the licence plate well may be insufficient to permit such identification. If the licence plate well lighting is not functioning, no licence plate illumination will occur in these circumstances.

One solution to these problems is to illuminate a licence plate from the inside rather than from the outside as described above. Thus, holes are punched into the sheet metal which forms the licence plate, and glass numbers, letters or symbols corresponding to the punched out portions of the sheet metal are inserted therein. When illuminated from behind, the letters, numerals or symbols will be highly visible to a person viewing the vehicle despite a certain amount of dust or grime on the external surface thereof since illumination does not depend upon reflectivity from the external surface. An internally illuminated licence plate will be visible despite ambient light conditions whether mounted on the front or the rear of a vehicle. Such a licence plate also provides a safety advantage since a car with a missing headlight or taillight can never be mistaken for a motorcycle given the unmistakable positioning of an illuminated licence plate on the front or rear of the vehicle respectively. Although such licence plates have been proposed in the past, to date, none of them has been commercially successful since they are not of a sturdy enough construction to withstand the rigors of motoring, or are too costly to produce.

SUMMARY OF THE INVENTION

Accordingly, it would be an advantage to provide a licence plate of sturdy construction wherein the letters, numerals and symbols to be illuminated would be firmly connected to an opaque face plate. It would be a further advantage to provide a licence plate adapted to be illuminated from the vehicle side of the plate rather than by sources outside the vehicle. A licence plate which is equally visible under all light conditions whether mounted on the front or rear of the vehicle, or on both the front and rear, would provide additional advantages.

In accordance with a principal aspect of the invention, a licence plate adapted for illumination comprises an opaque face plate having outward-facing and inward-facing faces, and comprises cut-out areas corresponding to numerals, letters, symbols or designs; and a translucent, heat-deformable backing plate heat-pressed against the inward-facing face of said face plate to force portions of the backing plate into the cut-out areas; such that when the licence plate is illuminated from a point inward of the backing plate, the portions of the backing plate within the cut-out areas are illuminated for viewing from a point outward of the face plate.

In further aspects of the invention:
(a) the translucent backing plate comprises a heat-deformable thermoplastic material which is rigid at normal ambient air temperatures;
(b) the heat-deformable thermoplastic material remains rigid at temperatures below about 150° Fahrenheit;
(c) the opaque face plate comprises a metal resistant to weathering;
(d) the metal comprises stainless steel.

In a further aspect of the invention, a licence plate assembly comprises: a housing comprising a source of light; an opaque face plate having outward-facing and inward-facing faces, and comprising cut-out areas corresponding to numerals, letters, symbols or designs, the face plate adapted to be mounted to the housing; a translucent, heat-deformable backing plate heat-pressed against the inward-facing face of the face plate to force portions of the backing plate into the cut-out areas; such that when the face plate with the backing plate is mounted to the housing, an enclosure is formed and the source of light may illuminate the portions of the backing plate in the cut-out areas for viewing from a point outward of the face plate.

In further aspects of the invention, the licence plate assembly:
(a) further comprises a gasket between the face plate and the housing to seal the enclosed housing of the licence plate assembly from contamination;
(b) the gasket comprises a flexible synthetic rubber or thermoplastic material;
(c) further comprises a hinge connection between the face plate and the housing, to permit the face plate to be hingedly opened to facilitate maintenance and replacement of the light source;
(d) the source of light comprises an incandescent electrical light bulb;
(e) the light bulb is adapted to generate heat during operation sufficient to melt ice and snow accumulated on the face plate;

(f) the face plate is mounted to the housing by means of a fastener;

(g) the fastener comprises a screw;

(h) the fastener comprises a latch.

In a further aspect of the invention, a method of manufacturing a licence plate adapted for illumination comprises: cutting openings in a metal face plate using a laser to create neat cut-out areas corresponding to numerals, letters, symbols or designs; pressing a substantially rigid, translucent, heat-deformable thermoplastic backing plate against the face plate with sufficient force and at a sufficient temperature to deform the backing plate and to force portions of the backing plate through the cut-out areas without disrupting the unity of the backing plate, and to fix the backing plate to the face plate; cooling the combined face plate and backing plate to permit the backing plate to return to a substantially rigid state.

Further aspects of the invention will become apparent from the following detailed description of the invention.

DETAILED DESCRIPTION OF THE INVENTION

Figure 1:
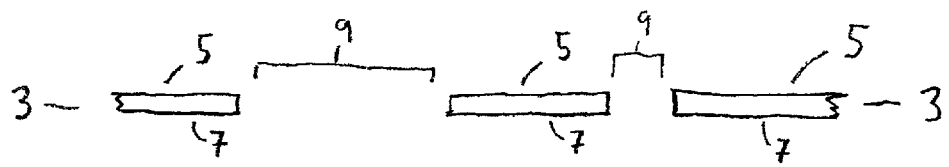
FIG. 1 is a schematic, cross-sectional view of the licence plate components prior to assembly.
Figure 1:
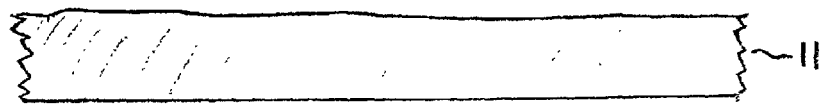
Figure 2:
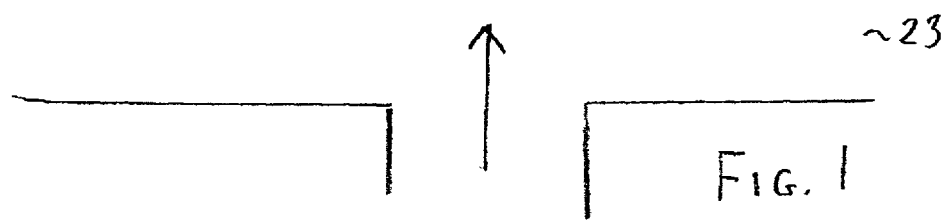
FIG. 2 is a schematic, cross-sectional view of the licence plate components during assembly.
Figure 3:
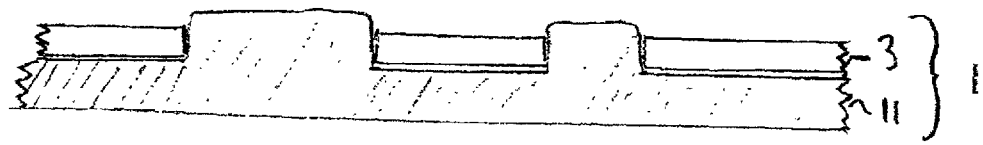
FIG. 3 is a schematic, cross-sectional view of the licence plate components following assembly.
Figure 3:
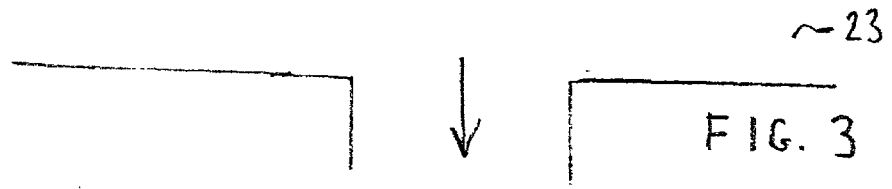

Referring to FIGS. 1 to 3, a licence plate 1 comprises an opaque face plate 3 having an outward-facing face 5 and an inward-facing face 7, and comprising cut-out areas or orifices 9 corresponding to numerals, letters, symbols or designs. In order to create the licence plate, a translucent, heat deformable backing plate 11 is heat-pressed using heat press 23 against the inward-facing face 7 of the face plate 3 to force portions of the backing plate 11 into the cut-out areas 9. Thus, when the process for heat forming the licence plate is complete, portions of the translucent backing plate 11 project outwardly of the outward-facing face 5 of the face plate 3 and the backing plate 11 is fused or mechanically connected at least in part by reason of the locking action between the protruding portions of the backing plate 11 and the face plate 3.

It has been found that use of a laser to form the cut-out areas 9 in the opaque face plate 3 is particularly advantageous since it creates a very precise edge and is subject to computer programming for the creation of different patterns which can be modified in a very rapid fashion. The computer control of laser cutting is well known in the art but has not been applied to the production of licence plates since opaque face plates are generally stamped to emboss numerals, letters, symbols and designs.

The translucent backing plate 11 is preferably a deformable plastic material, namely a thermoplastic which is substantially rigid at normal ambient air temperatures, even if flexible, but which becomes soft and able to flow to some degree when heated. It has been found that use of heat-deformable thermoplastic sheets which remain essentially rigid at temperatures below about 150° Fahrenheit is preferable. Under these conditions, the chance of the backing plate becoming softened under even extreme ambient weather conditions is very small. The choice of temperature and pressure conditions to create the licence plate by bonding the face plate 3 and backing plate 11 as described above, will depend on the materials chosen, and particularly upon the backing plate material chosen.

It has been found that sheet metal resistant to weathering is an ideal material for the opaque face plate 3. A metal which is highly resistant to weathering and denting, such as stainless steel, is preferred. Stainless steel is substantially rigid and strong. It is particularly resistant to weathering by reason of oxidation or rusting caused by contact with water and air. Although stainless steel with a thickness of about 1 millimeter is a preferred material for the opaque face plate 3, other materials such as thermoplastic sheets with very high softening temperatures may be employed. When thermoplastic materials are used for the face plate, colours may be incorporated into the thermoplastic material itself. The face plate may be opaque under these circumstances, as with a metal face plate. Alternately, a translucent face plate may be employed to benefit from light projected from the light source 15 adjacent the inward-facing face 7 of the face plate 3. This construction is, however, more complex since the backing plate 11 and the face plate 3 will form a relatively thick mass through which such light must travel. In addition, the colours of the backing plate and face plate must be coordinated so that the appropriate appearance and colour contrast is achieved for viewing of the licence plate 1 from a point outward of the face plate 3.

Figure 4:
FIG. 4 is a front, elevation view of an assembled licence plate.

The licence plate construction referred to above will be suitable for day-light conditions. The metal face plate 3 may be painted with a metallic reflective paint and the thermoplastic material of the backing plate 11 may have a reflective exterior surface, or internal reflective components dispersed throughout. For example, the thermoplastic material may be manufactured with metallic flakes embedded therein. Such metallic flakes are reflective components which reflect external light, thus assisting in illuminating the material in which they are dispersed. In this way, the licence plate of this construction, as illustrated in FIG. 4, may function as a normal reflective licence plate without the need for internal (i.e. non-external) illumination, by reflecting ambient daylight or other sources of light, such as headlights or flashlights. One advantage of this construction over current licence plates is that since the letters, numerals, symbols and designs projecting through the face plate comprise a uniformly coloured mass, they are not subject to being obliterated in the same way as a painted surface. Such letters or symbols may be scratched, but cannot be defaced by paint removal since they are not painted.

Figure 5:
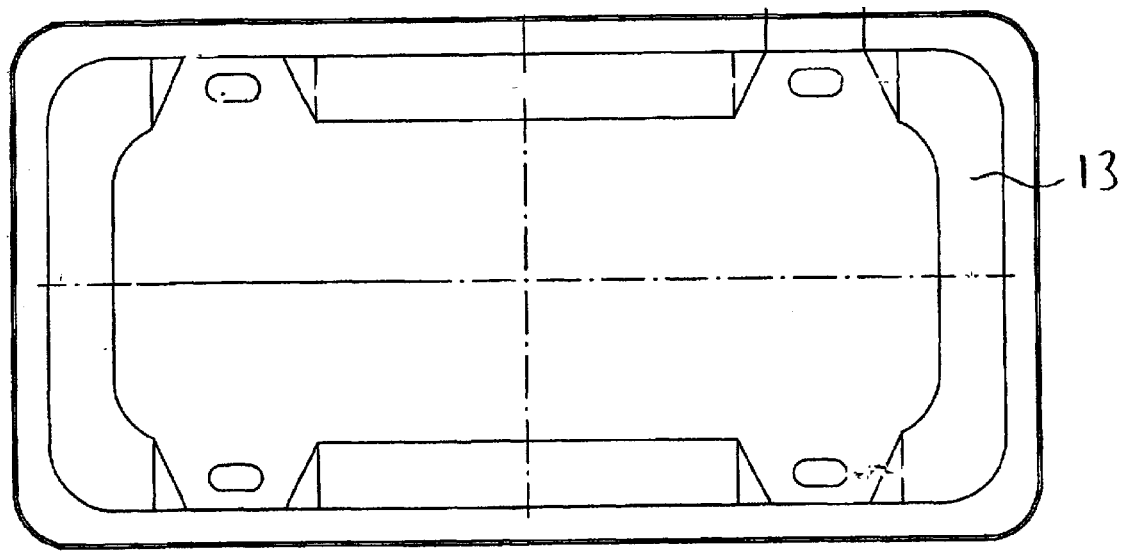
FIG. 5 is a rear, elevation view of a licence plate housing.
Figure 6:
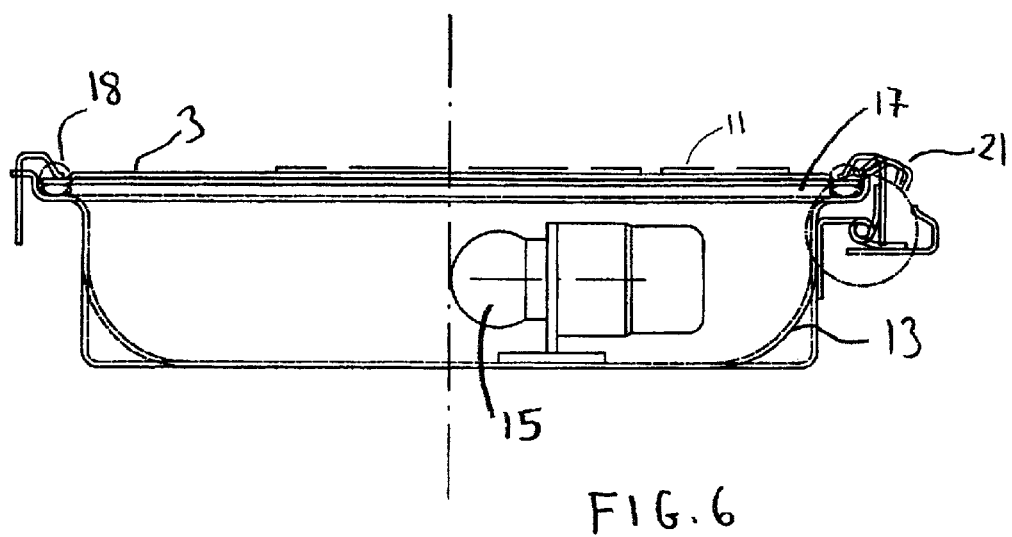
FIG. 6 is a schematic, cross-sectional view of an assembled licence plate and housing.
Figure 1:
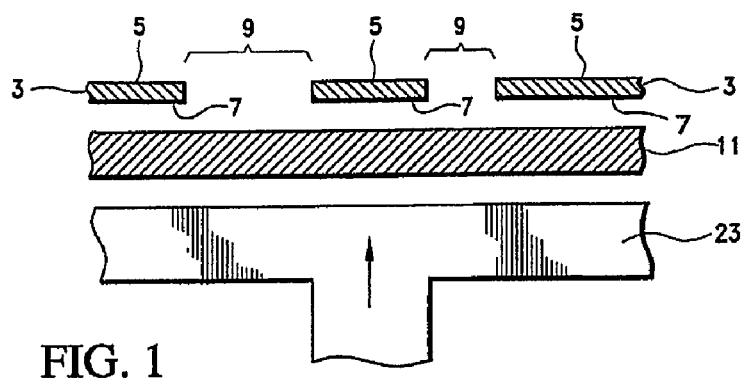
Figure 2:
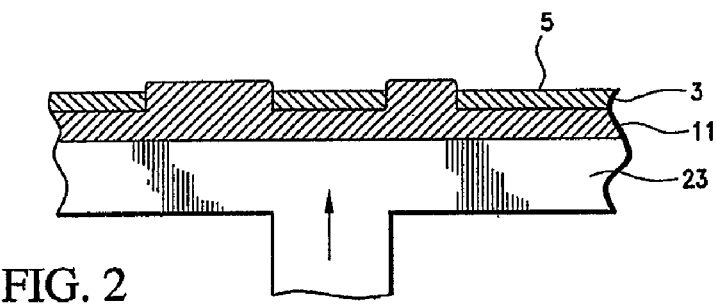
Figure 3:
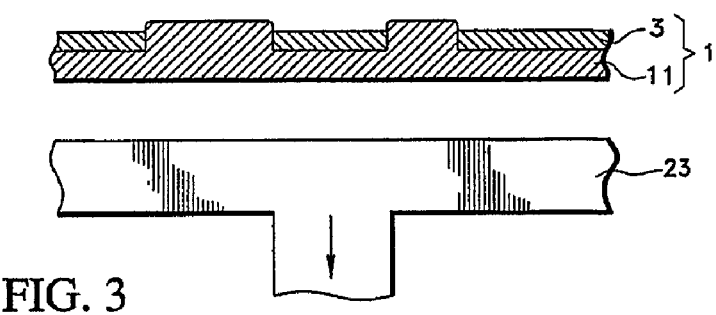

The greatest benefits of this construction, however, are achieved by creating a licence plate assembly as illustrated in FIGS. 5 and 6, which includes a housing 13 comprising a source of light 15. Typically, the housing 13 is also constructed of stainless steel and the source of light 15 comprises an incandescent light bulb which is powered from the automotive electrical system of the vehicle on which it is installed in the same way as tail lights, head lights, and standard licence plate well-mounted lights. Although stainless steel of a thickness of about 1 millimeter is a preferred material for the housing 13, other strong materials resistant to weathering may be chosen. These may include certain suitable durable thermoplastic materials. Such materials are typically lighter and less expensive than stainless steel, but they may be more subject to becoming brittle and cracking under conditions of extreme cold, or conditions of prolonged heat.

In a typical construction, a gasket 17 created from a spongy or foam rubber, artificial rubber or plastic material is mounted between the face plate 3 and the housing 13 in order to seal the enclosed housing of the licence plate assembly from contamination by dust, rain, and the like. Preferably, a hinge 18 is suitably mounted between the face plate 3 and the housing 13 to permit the face plate 3 to be hingedly opened to facilitate maintenance and replacement of the light source 15. The face plate 3 may be latched to the housing by latch 21 for ease of maintenance, including changing of the light source, or may be fastened by means of bolts, screws, or the like in a manner akin to the fastening of normal prior art licence plates to vehicles.

One advantage of using an incandescent light bulb as a light source 15 within the licence plate housing 13 is that heat generated by the light bulb may be sufficient to melt snow or ice which lands on the licence plate. This assists in preventing the licence plate numerals, symbols, etc. from being obscured by snow or ice during winter conditions, and improves the visibility and identifiability of the licence plate. The use of an incandescent light bulb has been found effective to provide sufficient heat energy to melt ice and snow and to prevent the accumulation thereof on such a licence plate in temperatures typical of normal winter conditions in the relatively populated areas of North America. Light bulbs which generate from 5 Watts to 100 Watts may be effective. Of course, the heat capacity and heat transfer properties of the materials chosen for construction of the licence plate and housing will greatly affect the effectiveness of such heating apparatus. If required, separate heating elements (not illustrated) may be incorporated into the licence plate itself, powered by the same automotive electrical system as the licence plate light.

Although a preferred embodiment of the invention has been described, modifications of the invention will be apparent to those skilled in the art without departing from the spirit and scope of this invention.

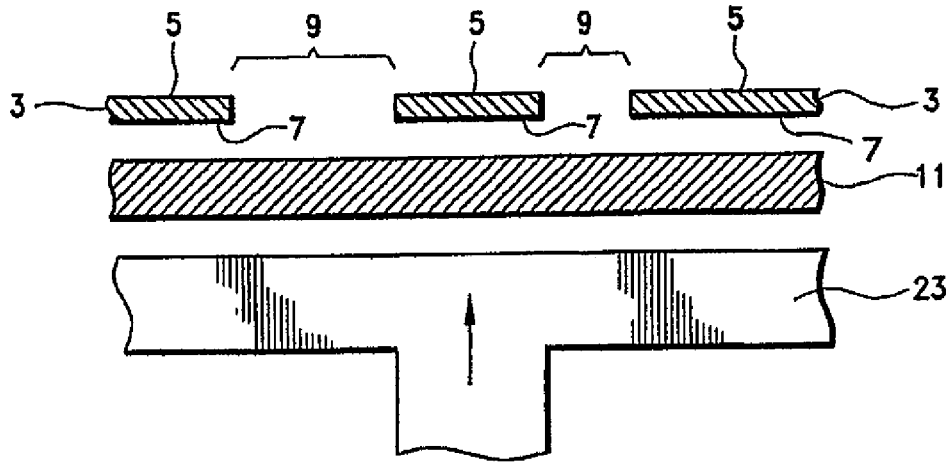

What is claimed is:

1. A licence plate adapted for illumination comprising:
   (a) an opaque face plate having outward-facing and inward-facing faces, and comprising cut-out areas corresponding to numerals, letters, symbols or designs;
   (b) a translucent, heat-deformable backing plate heat-pressed against the inward-facing face of said face plate wherein portions of said backing plate protrude into said cut-out areas;
   such that when said licence plate is illuminated from a point inward of said backing plate, the portions of said backing plate within said cut-out areas are illuminated for viewing from a point outward of said face plate.

2. The licence plate of claim 1, wherein the translucent backing plate comprises a heat-deformable thermoplastic material which is rigid at normal ambient air temperatures.

3. The licence plate of claim 2, wherein the heat-deformable thermoplastic material remains rigid at temperatures below about 150° F.

4. The licence plate of claim 1, wherein the opaque face plate comprises a metal resistant to weathering.

5. The licence plate of claim 4, wherein the metal comprises stainless steel.

6. A licence plate assembly comprising:
   (a) a housing comprising a source of light;
   (b) an opaque face plate having outward-facing and inward-facing faces, and comprising cut-out areas corresponding to numerals, letters, symbols or designs, said face plate adapted to be mounted to said housing;
   (c) a translucent, heat-deformable backing plate heat-pressed against the inward-facing face of said face plate to force portions of said backing plate into said cut-out areas;
   such that when the face plate with the backing plate is mounted to the housing, an enclosure is formed and the source of light may illuminate the portions of the backing plate in said cut-out areas for viewing from a point outward of said face plate.

7. The licence plate assembly of claim 6, wherein the housing comprises a metal resistant to weathering.

8. The licence plate assembly of claim 7, wherein the metal of the housing comprises stainless steel.

9. The licence plate assembly of claim 6, wherein the face plate comprises a metal resistant to weathering.

10. The licence plate assembly of claim 9, wherein the metal of the face plate comprises stainless steel.

11. The licence plate assembly of claim 6, further comprising a gasket between the face plate and the housing to seal the enclosed housing of the licence plate assembly from contamination.

12. The licence plate assembly of claim 11, wherein the gasket comprises a flexible synthetic rubber or thermoplastic material.

13. The licence plate assembly of claim 6, further comprising a hinge connection between the face plate and the housing, to permit the face plate to be hingedly opened to facilitate maintenance and replacement of the light source.

14. The licence plate assembly of claim 6, wherein the source of light comprises an incandescent electrical light bulb.

15. The licence plate assembly of claim 14, wherein the light bulb is adapted to generate heat during operation sufficient to melt ice and snow accumulated on the face plate.

16. The licence plate assembly of claim 6, wherein the face plate is mounted to the housing by means of a fastener.

17. The licence plate assembly of claim 16, wherein the fastener comprises a screw.

18. The licence plate assembly of claim 16, wherein the fastener comprises a latch.

19. A method of manufacturing a licence plate adapted for illumination comprising:
   (a) cutting openings in a metal face plate using a laser to create neat cut-out areas corresponding to numerals, letters, symbols or designs;
   (b) pressing a substantially rigid, translucent, heat-deformable thermoplastic backing plate against said face plate with sufficient force and at a sufficient temperature to deform the backing plate and to force portions of said backing plate through said cut-out areas without disrupting the unity of the backing plate, and to fix the backing plate to the face plate;
   (c) cooling the combined face plate and backing plate to permit the backing plate to return to a substantially rigid state.

\* \* \* \* \*

UNITED STATES PATENT AND TRADEMARK OFFICE
CERTIFICATE OF CORRECTION

PATENT NO. : 6,779,914 B2
APPLICATION NO. : 10/163589
DATED : August 24, 2004
INVENTOR(S) : Katsuo Arai et al.

It is certified that error appears in the above-identified patent and that said Letters Patent is hereby corrected as shown below:

Delete title page and substitute therefor the attached title page.

In the drawings, delete Figs. 1-3 and insert corrected Figs. 1-3 attached hereto.

In Column 6, Line 9, delete "to force" and insert --wherein-- and, before the word "into" insert --protrude--.

Signed and Sealed this

Eighteenth Day of September, 2007

JON W. DUDAS
*Director of the United States Patent and Trademark Office*

(12) United States Patent
Katsuo et al.

(10) Patent No.: US 6,779,914 B2
(45) Date of Patent: Aug. 24, 2004

(54) LICENCE PLATE ADAPTED FOR INTERNAL ILLUMINATION

(76) Inventors: Arai Katsuo, Kanagawa-ken, Fujisawa-shi, Cho Go 2488-30 (JP); Enomoto Toshinori, Kanagawa-ken, Yokohama-shi,Asahiku-kirigasaku (JP); Bounnakhone J. Suyavong, 1451 Fisher Avenue, Ottawa, Ontario (CA), K2C 1X3; Kham Jimmy Chounpanh, 470 Doubletree Lane, Newmarket, Ontario (CA), L3X 39E ( * ) Notice: Subject to any disclaimer, the term of this patent is extended or adjusted under 35 U.S.C. 154(b) by 9 days.

(21) Appl. No.: 10/163,589

(22) Filed: Jun. 7, 2002

(65) Prior Publication Data
US 2003/0227780 A1 Dec. 11, 2003

(51) Int. Cl.$^7$ .................................................. B60Q 1/58
(52) U.S. Cl. .................... 362/497; 362/520; 362/812; 40/206
(58) Field of Search ........................ 362/497, 520, 362/521, 522, 29, 812; 40/204, 206, 209

(56) References Cited

U.S. PATENT DOCUMENTS

| | | | | |
|---|---|---|---|---|
| 3,604,921 A | * | 9/1971 | Wood et al. | 362/308 |
| 3,973,342 A | * | 8/1976 | Gubela | 40/582 |
| 5,455,129 A | * | 10/1995 | Bussard | 430/1 |
| 5,485,145 A | * | 1/1996 | Sniff | 340/815.4 |
| 2002/0127949 A1 | * | 9/2002 | Lee et al. | 446/384 |

* cited by examiner

*Primary Examiner*—Alan Cariaso
*Assistant Examiner*—Mark Tsidulko
(74) *Attorney, Agent, or Firm*—Kramer & Amado, P.C.; Gordon J. Zimmerman, Esq.

(57) ABSTRACT

A licence plate adapted for illumination, which has an opaque face plate having outward-facing and inward-facing faces, and cut-out areas corresponding to numerals, letter, symbols or designs; and a translucent, heat-deformable backing plate heat-pressed against the inward-facing face of the face plate to force portions of the backing plate into the cut-out areas, such that when the licence plate is illuminated from a point inward of the backing plate, the portions of the backing plate within the cut-out areas are illuminated for viewing from a point outward of the face plate.

19 Claims, 3 Drawing Sheets